Oct. 6, 1970 J. R. BROWN, JR 3,533,081

METHOD AND APPARATUS FOR READING INFORMATION FROM A MEMORY

Filed Jan. 4, 1968 3 Sheets-Sheet 1

INVENTOR.
Joseph REESE BROWN, JR.
BY
Christie, Parker & Hale
ATTORNEYS.

INVENTOR.
JOSEPH REESE BROWN, JR.
BY Christie, Parker & Hale
ATTORNEYS.

METHOD AND APPARATUS FOR READING INFORMATION FROM A MEMORY

Filed Jan. 4, 1968 3 Sheets-Sheet 3

INVENTOR.
JOSEPH REESE BROWN, JR.
BY
Christie, Parker & Hale
ATTORNEYS.

United States Patent Office 3,533,081
Patented Oct. 6, 1970

3,533,081

METHOD AND APPARATUS FOR READING INFORMATION FROM A MEMORY

Joseph Reese Brown, Jr., Warren Township, N.J., assignor to Burroughs Corporation, Detroit, Mich., a Corporation of Michigan Filed Jan. 4, 1968, Ser. No. 695,712
Int. Cl. G06f *13/08;* G11c *7/00, 11/14*
U.S. Cl. 340—172.5 8 Claims

ABSTRACT OF THE DISCLOSURE

A thin film memory system having memory planes arranged into rows and columns bearing thin film elements. Each memory plane is divided into memory half planes. A sense line is provided for each row of thin film elements on the memory planes and forms a loop passing along one side of the memory half planes and returning along the opposite side of the half planes. The portions of the sense lines on each side of the memory half planes are transposed in between the half planes causing a pulse of one polarity on the sense lines to represent a first binary bit when reading takes place at one of the half planes and causing a pulse of the same polarity on the sense lines to represent a second binary bit when reading takes place at the other half plane. An information register is provided for storing information being read out of and being written into the memory. A memory address register stores the address of the location which is to be addressed. Decoders and drivers provide the desired current signals to the system for reading and writing.

BACKGROUND OF THE INVENTION

Field of the invention

This invention relates to thin film memories and, more particularly, to method and apparatus for reading information out from thin film memories and for storing the information into an information register.

Description of the prior art

Thin film memory arrays are known which consist of a matrix of rectangular spots of nickel-iron material deposited on back planes by vacuum evaporation techniques. Thin film memory systems commonly have memory planes which are broken down into two half planes. Sense lines are provided on which signals read out from the memory appear. The sense lines are transposed in between half planes for noise cancellation purposes. As a result, signals representing the same information formed on the sense lines come out in one polarity when reading takes place on one half plane but of the opposite polarity when reading takes place on the other half plane. For example, a pulse on the sense lines of one polarity from one half plane will represent one binary bit, whereas a pulse on the sense lines of the same polarity from the other half plane will represent the other binary bit.

To sense the signals of both polarities in the aforementioned system, places an unnecessary burden on the sense amplifier and associated circuits, thereby substantially increasing cost of the thin film memory.

One way in which the aforementioned problem has been solved is to reverse the polarity of the digit currents in one of the half planes from the polarity of the digit currents in the other half plane. A digit current is the current which determines which of two binary representations is to be stored in a particular thin film memory spot. This solution to the problem causes all binary bits of one value to come out with the same polarity and all binary bits of the other value to come out with the opposite polarity, regardless of the half plane from which information is read.

To achieve the polarity reversal of the digit current requires considerable logical circuitry for the digit drivers and is quite expensive.

SUMMARY OF THE INVENTION

Briefly, an embodiment of the present invention is in a memory system having an address register. The memory has a plurality of output circuits at which a pulse of one polarity represents a predetermined one of two binary bits when read from a first class of addresses and represents the second binary bit when read from a second class of addresses. A bistable storage element is provided for each of the output circuits. The improvement lies in means coupled to the address register for initially causing each of the storage elements to be set either to a first or to a second state, depending on whether the stored address is of said first or of said second class, respectively. Means is coupled to the output circuits of the memory and to the storage elements for causing the state of each storage element to be complemented in response to a predetermined polarity of signal from the corresponding output circuit and thereby cause the state thereof to represent information read out of the memory.

Briefly, a method in accordance with the present invention is for reading out information from memory and for storing the information into an information register containing a plurality of storage elements. Each row of the memory matrix has a sense line which forms a continuous loop passing along one side of hhe memory planes and returns along the opposite side of the memory planes. The portions of the sense lines on each side of the memory planes are transposed at least once causing a pulse of one polarity on the sense lines to represent a first binary bit when reading takes place at a first group of memory locations and causing a pulse of the same polarity on the sense lines to represent a second binary bit when reading takes place at a second group of memory locations. The steps include presetting each of the storage elements in the information register to either a first state or to a second state when reading is to take place from the first or the second groups of memory locations, respectively, complementing each storage element whenever the corresponding sense line receives a pulse of the first polarity and thereby cause the storage elements of the information register to store a representation of the information read out from the memory.

The present invention is of considerable importance as it results in a substantial decrease in the amount of logical circuitry required for the memory system. In particular it eleminates the logical circuitry required to control the digit drivers for polarity reversal.

DESCRIPTION OF THE PREFERRED EMBODIMENT

Description of prior art circuits

Figures 1, 1A:
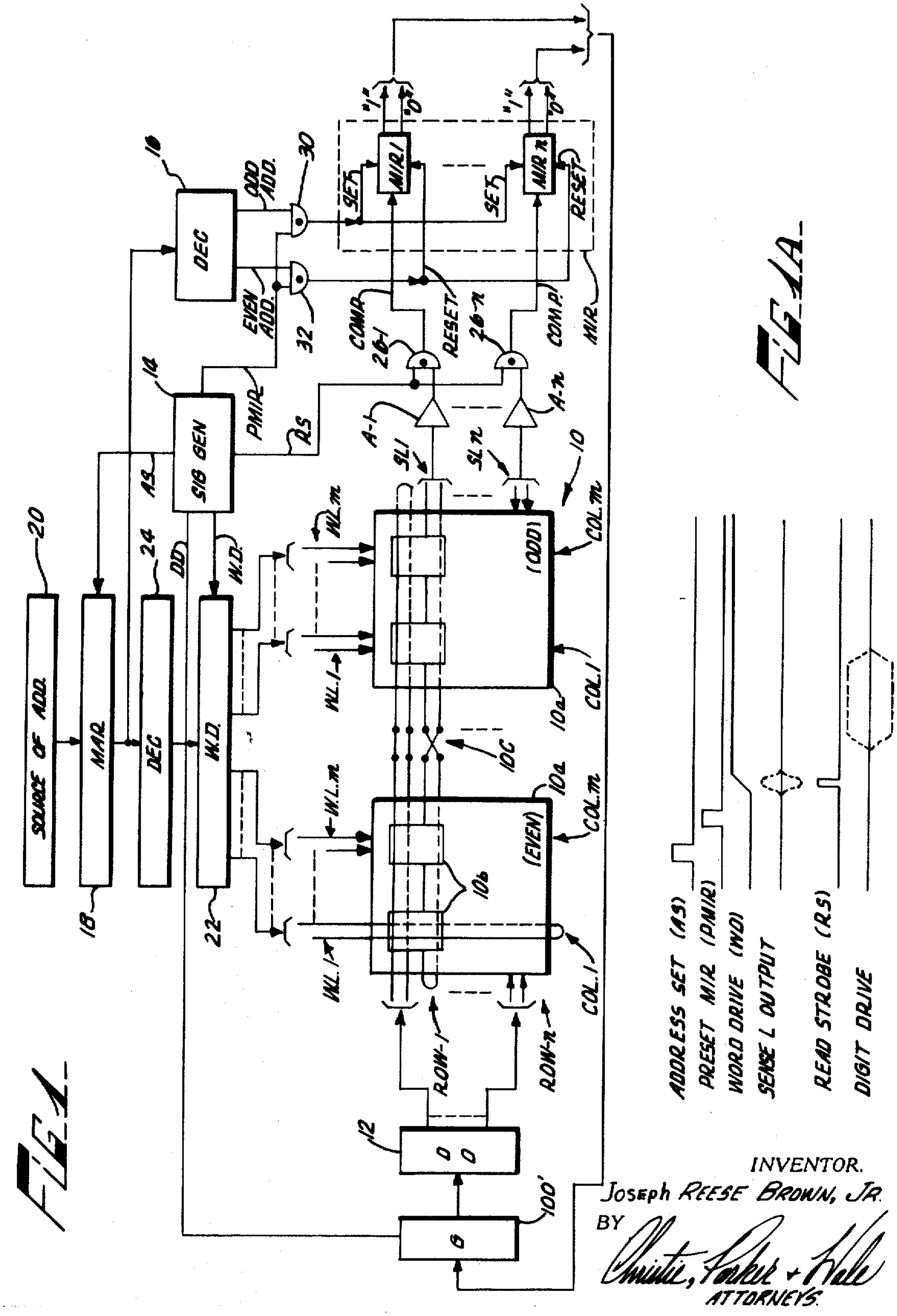
FIG. 1 is a schematic and block diagram of a thin film memory system embodying the present invention.
FIG. 1A is a sketch illustrating the signals at the designated points in the thin film memory system of FIG. 1.
Figure 2A:
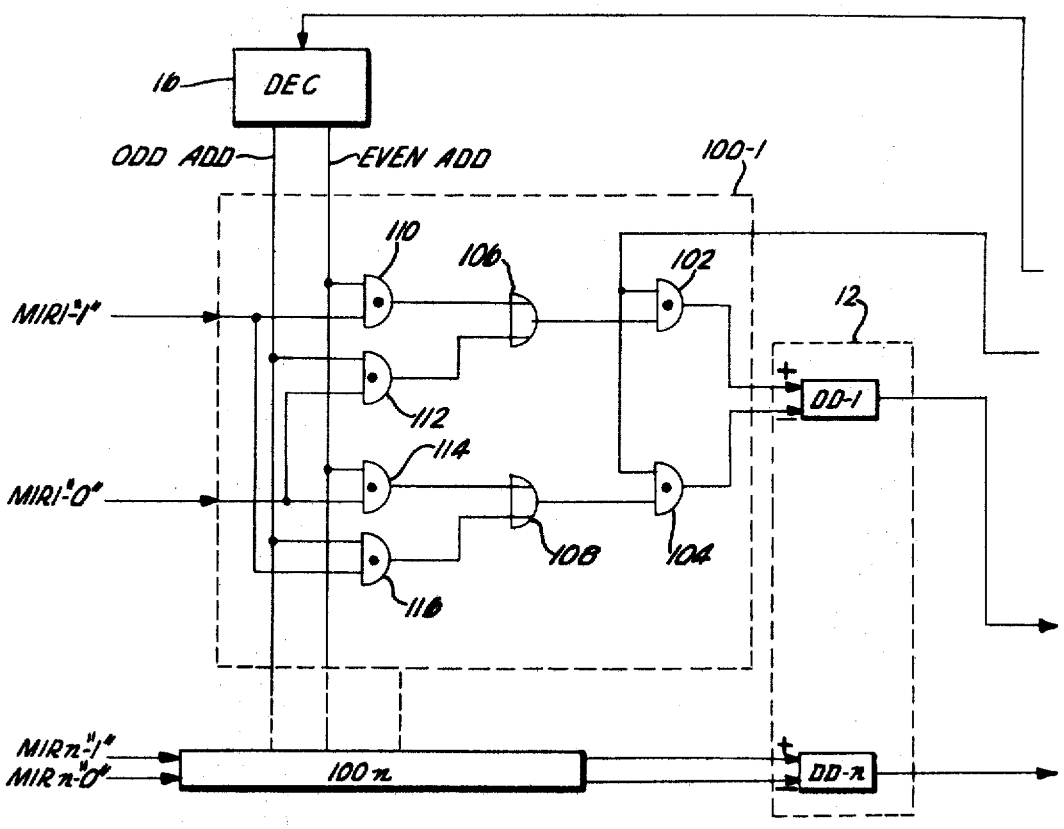
PRIOR ART FIG-2A
FIGS. 2A and 2B is a schematic and block diagram illustrating the prior art.
Figure 2:
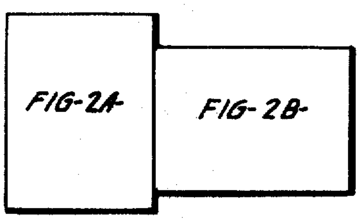
FIG. 2 including

Before considering the details of FIG. 1 which show the present invention, consider the prior art arrangement so that a comparison can be made between the two. The prior art system is shown in FIG. 2. Included is a thin film memory 10 which includes a plurality of memory planes which are divided into half planes 10$a$. Two memory plane halves 10$a$ form one memory plane. Only one memory plane or two half planes 10$a$ are shown in FIG. 2, however, it should be noted that additional memory planes are provided in the system.

Figure 2B:
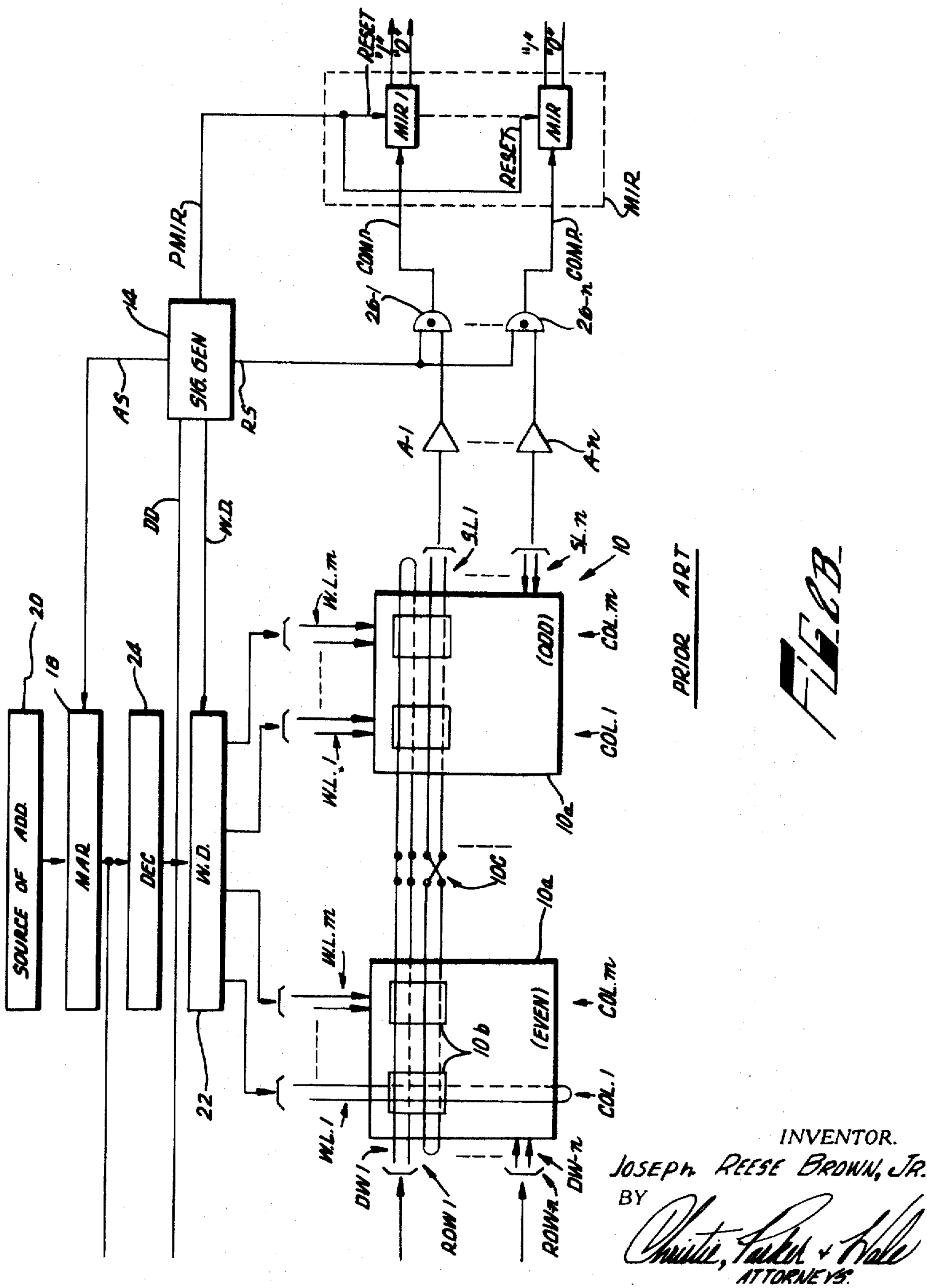

Each half plane 10$a$ has a plurality of nickel-iron spots 10$b$. The spots 10$b$ are deposited by vacuum evaporation techniques in a rectangular shape on the half planes. Only two of the thin film spots or elements 10$b$ are shown in FIG. 2B on each half plane for purposes of illustration. However, it should be understood that there are many thin film elements arranged in a coordinate array of horizontal rows and vertical columns on each of the half planes 10$a$.

Associated with each column of thin film elements is a line referenced by the symbol WL in FIG. 2B. Such lines are alternatively called write lines or word lines. There are M write lines associated with each half plane and are referenced by the symbols WL1 through WLM. Only write line WL1 and partially write line WLM are shown, dashed lines being used to indicate the additional write lines. Each write line passes across the front surface of the thin film elements in the corresponding column and returns along the backside of the half plane in the opposite direction. To be explained, a current signal on a write line causes the content of each thin film element in the corresponding column to be read out and applied to the corresponding sense lines.

Associated with each row of memory elements in the memory 10 is a sense line and a digit wire. The digit wires are referenced by the symbols DW1 through DW$n$ corresponding to $n$ rows of memory elements on each half plane. Only digit wires DW1 and partially DW$n$ are shown the other digit wires being indicated by dashed lines. Each digit wire passes across the front surface of the memeory elements of all half planes and returns along the reverse side of the half planes. It should be noted that the digit wires pass across the upper side of all of the memory elements in all of the half planes before returning along the reverse side thereof.

The sense lines are referenced by the symbols SL1 through SL$n$ corresponding to the $n$ rows of memory elements. Only sense line SL1 and partially sense line SL$n$ are shown, the other sense lines being indicated by dashed lines. The ends of the sense line start out at terminals shown at the right side of FIG. 2B. The sense lines extend in one direction along the front side of the memory elements and return along the opposite side thereof. However, in contrast to the digit wires, the portions of the sense lines on opposite sides of the memory elements are transposed in between each adjacent half plane. In this manner, a portion of a sense line passes across the upper surface of the memory elements in one half plane and then goes to a portion passing across the backside of the memory elements in the adjacent half plane. The reversing or transposing connection is indicated at 10$c$.

The purpose of the transposition of the sense lines in between half planes is to provide noise cancellation in the sense lines. However, transposition of the sense lines has the effect of causing the sense signals from the two half planes to come out in opposite polarity. For example, a signal representing a binary bit "1" read out of one half plane will be represented by a pulse of one polarity on a sense line, whereas a signal representing a binary bit "1" read out from the adjacent half plane will appear on a sense line as a pulse of the opposite polarity.

To overcome the aforementioned problem, special gating has been provided for controlling the digit drivers in a special manner so that a drive signal of one polarity is used to store a signal representing a binary bit "1" in one half plane, whereas a current pulse of the opposite polarity is used to store a signal representing a binary bit "1" in the adjacent half plane. Signals of the opposite polarity are used to write a binary bit "0." This then causes all signals of one polarity on the sense lines to represent one binary bit and all signals of the opposite polarity to represent the other binary bit.

Consider briefly the required gating in the prior art with reference to FIG. 2. Digit drivers 12 are conventional circuits that are well known in the art and apply drive signals to the digit wires in the memory 10. A digit driver is provided for each row in the memory 10. The digit drivers are referenced by the symbols DD–1 through DD–$n$. Each digit driver is capable of applying either a positive current pulse or a negative current pulse to the corresponding digit wire under control of signals applied to one of the two inputs thereof. The two inputs are referenced by the symbols "—" and "+" corresponding to the negative and positive output signals formed in response to control signals.

Each digit driver DD has a gate 100 connected thereto for controlling the operation thereof. The gates for digit drivers DD–1 through DD–$n$ are referenced by the symbols 100–1 through 100–$n$. Each of the gates 100 are identical except for their input connections. Also provided in the system is a memory information register MIR. The memory information register has a flip-flop circuit referenced by the symbol MIR for each row in the memory 10. The flip-flop circuits MIR for rows 1 through $n$ are referenced by the symbols MIR1 through MIR$n$. Only flip-flops MIR1 and MIR$n$ are shown for purposes of illustration and the other flip-flop circuits are indicated by dashed lines. Each flip-flop has two output circuits. The output circuit which receives a control signal when the corresponding flip-flop is in a 1 state is referenced by the symbol "1." The flip-flop output circuit which receives a control signal when the corresponding flip-flop is in a 0 state is referenced by the symbol "0."

Return now to the gates 100. Each gate includes an AND gate 102 and an AND gate 104. The AND gate 102 is connected to the "+" input of the corresponding digit driver which causes a positive current pulse. The AND gate 104 is connected to the "—" input of the corresponding digit driver that causes a negative current pulse from the driver. The AND gates 102 and 104 are each connected to the DD output of a signal generator 14. The gates 102 and 104 also have an input connected to the outputs of OR gates 106 and 108, respectively. The OR gate 106 has two inputs connected to the outputs of AND gates 110 and 112. The OR gate 108 has inputs connected to the DD output of a signal generator 14. The OR gate 108 has inputs connected to the outputs of AND gates 114 and 116. The AND gates 110 through 116 have their inputs connected to the outputs of a decoder 16 and to the outputs of the corresponding flip-flop in the MIR register. The decoder 16 is a decoder which decodes the address being used to address the memory 10 and provides a control signal on either an ODD ADD or an EVEN ADD output line, depending on whether the address is odd or even, respectively. The AND gates 110 and 114 have their inputs connected to the EVEN ADD output of the decoder 16, whereas the AND gates 112 and 116 have an input connected to the ODD ADD output of the decoder 16.

In the gate 100–1, the gates 110 and 116 have another input connected to the "1" output of the flip-flop circuit MIR1, whereas the AND gates 112 and 114 have another input connected to the "0" output of the flip-flop MIR1.

Consider briefly the operation of the gate 100–1 in conjunction with the digit driver DD–1. The binary bits to be stored into the addressed location of the memory 10 are initially stored into the MIR register. The bits are written from the MIR register into the memory. An even address for the memory 10 is used to select one of the half planes of each plane, whereas an odd address is used to select the other one of the half planes of a plane. This arrangement is chosen because the digit current to write in one half plane is reversed to write the same information in the other half plane. The control for the digit drivers is made accordingly. An even address causes the detector 16 to apply a control signal on the EVEN ADD output to the gates 110 and 114. If the corresponding flip-flop in the MIR register contains a binary "1" bit, then a control signal is also applied on the "1" output causing the gate 110 to activate the gate 106 which in turn applies a control signal to the AND gate 102. A control pulse is applied on the output circuit DD from the signal generator 14 causing the gate 102 to apply a control signal to the "+" input circuit of the digit driver DD–1 causing a positive current pulse to be applied on the digit wire DW1. If, on the other hand, the binary bit stored in the MIR1 flip-flop is a binary "0" bit, then a control signal is applied on the "0" output causing the gates 114, 108 and 104 to apply a control signal to the "—" input of the digit driver DD–1 causing a negative pulse to be applied to the digit wire DW1.

If, on the other hand, the address is an ODD address, and hance addresses the other half of the plane, a current pulse of the opposite polarity is applied in the digit wire. Accordingly, a binary "1" bit in the flip-flop MIR1 causes the gate 116 and 108 and 104 to apply a control signal to the "—" input of the digit driver DD–1 causing a negative current pulse on the digit wire DW1. In contrast, a binary "0" bit in the MIR1 flip-flop causes the gates 12, 106, 102 to apply a control signal to the "+" input of the digit driver DD–1 causing a positive pulse to be applied on the digit wire DW1.

Thus, the polarity of the digit current pulse for writing a binary bit in one half plane (even address is the reverse of the polarity of that for writing the same binary bit in the adjacent half plane (odd address).

The gates 100–2 through **100–*n* are identical to the gating circuit 100–1 except that they have inputs connected to the flip-flop circuits MIR2** through MIR*n*, respectively.

A memory address register 18 is provided for actually storing the addresses used to address the memory 10. The addresses are received from a source of addresses 20 and are stored into the register 18 in response to a pulse at the AS output of the signal generator 14. The output of the memory address register 18 is connected to the decoder 16 which in turn decodes the addresses stored in the memory address register 18 to determine whether the addresses are even or odd as described hereinabove.

A set of word drivers 22 are connected to the word lines WL1 through WL*n* of each half plane. The word drivers 22, apply a current pulse on one of the write lines WL1 through WL*n* of one of the half planes. A decoder 24 couples the memory address register 18 to the word drivers 22. The decoder 24 decodes the address contained in the memory address register 18 and in turn applies a control signal to the word drivers 22 which determine the word line to receive the current signal from the word drivers. The current signal provided by the word drivers 22 on one of the write lines determines the column, or address, in the memory from which information is to be read or into which information is to be written.

The write drivers 22 are connected to a WD output of the signal generator 14. To be explained, the signal generator 14 provides control signals to the word driver 22 on the output circuit WD which controls the application of the signals by the word drivers to the word lines.

The sense lines SL1 through SL*n* are connected to sense amplifiers A–1 through A–*n*. The output of the sense amplifiers A–1 through A–*n* are connected to AND gates 24–1 through **24–*n*, respectively. The AND gates 24–1 through 24–*n* have a second input connected to an output RS of the signal generator 14**.

The flip-flops MIR1 through MIR*n* are connected to the AND gates 24–1 through **24–*n*, respectively. The input of the MIR flip-flops to which the AND gates are connected is the input which causes the flip-flops to be complemented. The flip-flop circuits may be any one of a number of well known types, for example, the flip-flop may be of the type which has a special complementing input of the flip-flops may be of the type which contains gating thereof which is connected to the AND gates 24** and cause the flip-flops to be complemented in response to a control signal from the corresponding AND gate.

The flip-flop circuits MIR1 through MIR*n* also have an input connected to a PMIR output of the signal generator 14. All of the MIR flip-flops are always reset into a 0 state in response to a control signal at the PMIR output.

Description of operation of prior art circuits

Consider briefly the overall operation of the prior art circuits shown in FIG. 2. Information is written into the memory 10 and read out of the memory 10 a column at a time. Assume that an even address is stored in the MIR address register 14, thereby indicating that a column in the corresponding half plane is to be selected for reading or writing. Also assume that a read operation is to take place. The signal generator 14 applies a control signal to the WD output which causes the word drivers 22 to apply a current pulse on the word line corresponding to the address. This causes a signal to be induced on the sense lines SL1 through SL*n* corresponding to the information stored in the corresponding memory elements. A positive current pulse represents a binary 1 bit, whereas a negative current pulse represents a binary 0 bit. The amplifiers A–1 through A–*n* amplify the current pulses and apply the amplified signal to the corresponding AND gate 26. Concurrently with the signals to the AND gate 26 the signal generator 14 applies a control signal at the RS output causing each of the AND gates 26–1 which is receiving a positive pulse from the corresponding sense line to set the corresponding MIR flip-flop to a 1 state. Thus, following the control signal at RS the MIR register has each of its flip-flops set to either a 1 state or a 0 state representing the information read out of the corresponding column of the memory.

Assume now that it is desired to write information into the memory. The flip-flops of the MIR register are initially set to 1 and 0 states, representing information which is to be stored into the corresponding rows of a column in the memory 10. The flip-flops are set by conventional means not shown. The memory address register 18 is initially set by an address from the source of addresses 20 as described hereinabove. The word lines are oriented with respect to the thin film memory elements **10*h* such that they are perpendicular to, what is termed in the art, the "easy access" of the thin film element. The digit wires DW are oriented with respect to the thin film elements 10*h* so that they are parallel to the "easy access" of the thin film memory element. The signal generator 14 first applies a control signal to the WD output thereof causing the word drivers 22 to apply a current pulse to the addressed word line (WL). The signal generator 14 then applies a control signal at the DD output causing current pulses to be applied by the digit drivers 12 on each digit wire. The gates 100 activate the digit drivers as described hereinabove. The signal generator 14 then removes the control signal from the WD output causing the current signal from the word drivers 22 to be terminated. The signal from the digit drivers 12** continue causing the information stored in the MIR register to be written into the memory element. The signal generator then removes the signal from the DD output terminating the current from the digit drivers.

Description of circuits of present invention

Refer now to the schematic and block diagram embodying the present invention shown in FIG. 1. The memory 10, the digit drivers 12, the decoder 16, the signal generator 14, the memory address register 18, the source of addresses 20, the word drivers 22, the decoder 24, the AND gates 26, the amplifiers A–1 through A–*n* and the MIR register are all identical to that shown in the prior art of FIG. 2. Also they are generally connected together in the same way and generally function in a similar manner. Although a block is shown for all of the digit drivers 12, it will be understood that there is an individual digit driver circuit for each row of memory elements as shown in FIG. 2. The major differences between the present invention in FIG. 1 and the prior art of FIG. 2 lie in the control for the MIR register and in the gates connected to the digit drivers 12.

Consider first the control for the MIR register. The set input (causes a flip-flop to be set to a 1 state) of each of the MIR flip-flops is connected through an AND gate 30 to the input of the ODD ADD output of the decoder 16. The reset input (causes a flip-flop to be reset to a 0 state) of each of the MIR flip-flops is connected through an AND gate 32 to the EVEN ADD input of the decoder 16. The complement input of each of the MIR flip-flops is still connected to the output of the AND gates 26–1 through **26–*n*. The AND gates 30 and 32 have a second input connected to the PMIR output of the signal generator 14**.

A gating circuit 100′, contrasted with the gating circuit 100 in the prior art system shown in FIG. 2, is connected to the digit drivers 12. The gating circuit 100′ is a simple gating circuit which causes each digit driver in the digit drivers 12 to form either a positive or a negative current signal on the digit wires depending on whether the corresponding MIR flip-flop is in a 1 state or 0 state, respectively. Thus, in its simplest form the gating circuit 100′ includes a simple AND gate (not shown) for each of the two input circuits of the digit drivers DD (see FIG. 2 which shows two inputs). Each AND gate has an input from the DD output of the signal generator 14 and a second input from one of the output circuits of the corresponding MIR flip-flop.

Description of operation of circuits of present invention

Consider now the operation of the system shown in FIG. 1. During the following discussion reference should be made to FIG. 1A which is a sketch illustrating the sequence with which the indicated signals are formed in the system shown in FIG. 1. Initially the signal generator 14 forms a control pulse at the AS output causing the memory address register 18 to store a new address. Subsequently, the signal generator 14 forms a control pulse at the PMIR output. The decoder 16 decodes the address in the MAR register 18 and an outptu signal is formed at the EVEN ADD or the ODD ADD output circuit depending on whether the address is even or odd. The control signal at the PMIR output causes either the AND gate 30 or the AND gate 32 to set each of the MIR flip-flops to a 1 state or a 0 state, respectively, depending on whether a control signal is formed at the ODD ADD or the EVEN ADD output, respectively. The signal generator 14 then forms a control signal at the WD output causing the word drivers 22 to apply a current signal through the column corresponding to the address contained in the MAR register 18. This causes a positive or negative pulse to be formed on each of the sense lines corresponding to the binary signals (or the information) stored in the corresponding memory elements.

TABLE I

| Bit Read From Memory | Polarity of Pulse on Sense Line | Address | MIR FF Before | MIR FF After |
|---|---|---|---|---|
| 1 | + | EVEN | 0 | 1 |
| 0 | − | EVEN | 0 | 0 |
| 1 | − | ODD | 1 | 1 |
| 0 | + | ODD | 1 | 0 |

Table I illustrates the polarity of the signals for even and odd addresses and illustrates the state of the MIR register before and after information is read from memory. As indicated, if an odd address is contained in the MAR register 18 the flip-flops in the MIR register are initially set to 0 as described above. If a 1 bit is read from memory, the polarity of the pulse on the corresponding sense line is positive and the positive pulse on a sense line causes the corresponding amplifier A and the corresponding AND gate 26 to set the corresponding MIR flip-flop to a 1 state in response to the read strobe pulse at the RS output of the signal generator 14. Thus, following read strobe pulse (see FIG. 1A), the corresponding MIR flip-flop is in a 1 state and is storing a 1 bit which was read from memory. This action is illustrated on the first line of Table I.

Assume again that the address is even but that a 0 bit is read out from memory causing a pulse of a negative polarity on one of the sense lines. The negative pulse does not pass through the corresponding AND gate 26 (only positive pulses pass through) at the occurrence of the read strobe pulse at the RS output, hence the corresponding MIR flip-flop remains in a 0 state. Thus, following the strobe pulse at the RS output, the corresponding MIR flip-flop is still in a 0 state representing the 0 bit which was read out from the memory.

Assume now that the address contained in the MAR register 18 is odd causing the gate 30 to initially set each of the flip-flops in the MAR register into a 1 state. Also assume that a 1 bit is being read from one of the memory elements causing a signal of a negative polarity on the corresponding sense line. The negative pulse on the sense line does not get through the corresponding AND gate 26, hence the corresponding MIR flip-flop remains in a 1 state, thereby representing the binary 1 bit read out from memory.

Assume that the address contained in the MAR register 18 is still odd, hence the MIR register flip-flops are initially set to 1 states but that a 0 bit is read out from a memory element. This causes a pulse of a positive polarity to be read out and applied on the corresponding sense line. The positive pulse goes through the corresponding amplifier A to the corresponding AND gate 26 and the strobe pulse at the output circuit RS causes the AND gate to complement the state of the corresponding MIR flip-flop, thereby causing it to be in a 0 state. A 0 state of an MIR flip-flop represents a 0 bit which is the same as the bit read from memory.

It should now be understood that the memory system shown in FIG. 1 includes an address register (MAR)–18 and a memory 10 having a plurality of output circuits which are the sense lines. A pulse of one polarity on a sense line represents a predetermined one of two binary bits when read from a first class of addresses (i.e. even addresses), and represents a second binary bit when read from a second class of addresses (i.e. even addresses). A bistable storage element of flip-flop MIR is provided for each of the output circuits. Means including the AND gates 30 and 32 and a decoder 16 initially cause each of the storage elements MIR to be set to either a first state or to a second state, respectively, depending on whether the stored address is of the first or of the second class. means including the amplifier A and AND gates 26 are coupled to the sense lines and to the storage elements MIR for causing the state of each storage element to be complemented in response to a predetermined polarity (positive polarity) of signals from the corresponding sense lines, and as a result, the state of the MIR storage elements represent information read out from memory.

Briefly, when the steps for reading out information from the thin film memory and storing the information into the information register include the steps of presetting each of the storage elements MIR in the information register to either a first state or a second state when reading is to take place from the first or second class of memory locations, respectively. Each of the storage elements is complemented whenever the corresponding sense line receives a pulse of the first polarity, thereby causing the storage elements of the information register to store a representation of the information read out from the memory.

Although one example of the present invention has been shown by way of illustration, it should be understood that there are many other rearrangements and embodiments of the present invention within the scope of the following claims.

What is claimed is:

1. In a memory system having an address register therefor, the memory having a plurality of output circuits at which a pulse of one polarity represents a predetermined one of two binary bits when read from a first class of addresses and represents the second binary bit when read from a second class of addresses, a bistable storage element for each of said output circuits, the improvement comprising means coupled to the address register for initially causing each of the storage elements to be set either to a first or to a second state, respectively, depending on whether the stored address is of said first or of said second class, and means coupled to the output circuits of the memory and to said storage elements for causing the state of each storage element to be complemented in response to a predetermined polarity of signal from the corresponding output circuit and thereby cause the state thereof to represent information read out of the memory.

2. In a memory system having an address register for storing an address designating a memory location from which binary information is to be read, the memory having a plurality of output circuits at which pulses of two polarities are applied representative of information being read from memory, a pulse of one polarity representing a first binary bit when from an even address and representing a second binary bit when from an odd address, an information register having a bistable storage element for each of said output circuits and decoding means for providing first and second output signals when the stored addresses are even and odd, respectively, the improvement comprising means responsive to either a first or a second signal from the decoding means for initially causing each of the storage elements to be set either to a first or to a second state, respectively, ready to store a signal read out from the memory and separate means coupled to the information signal from each output circuit of the memory for causing the state of the corresponding storage element to be complemented in response to a predetermined polarity of the information signal and thereby cause the state of said storage elements to represent the information read out of the memory.

3. In a system as defined in claim 2 including a signal generator for providing a preset pulse and wherein said means for causing the storage element to be set comprises gating means responsive to said present pulse together with the signals from the decoding means for causing each of said storage elements to be set either to the first state or the second state depending on whether the signal from the decoding means is a first or a second signal, respectively.

4. In a system as defined in claim 3 wherein said signal generator provides a read strobe signal following the preset pulse and wherein each of said means for causing a storage element to be complemented comprises a gate coupled to the corresponding output circuit and responsive to the strobe signal for providing a signal to the corresponding storage element causing the state thereof to be complemented in response to a signal at the corresponding output circuit of a predetermined polarity.

5. In a thin film memory system having a plurality of planes of thin film memory elements, the memory elements being arranged into rows and columns and each having two sides, each of said planes having first and second half planes, a pair of output terminals at one side of said memory planes, a sense line for each row of elements having one end extending from one of said output terminals in one direction across one side of each of said memory elements in the corresponding row and returning along the opposite side of such memory elements to the other one of said terminals, the portions of each sense line on each side of the memory elements being transposed in between said half planes, an information register having a bistable storage device for each sense line, a conductor for each column of memory elements passing adjacent to the corresponding column of memory elements, an address register for designating a particular column of memory elements from which information is to be read, means coupled to the address register for applying a read current signal to the column conductor designated thereby causing a signal of one of two polarities to be applied on the sense lines representative of the information stored in the corresponding memory elements, decoding means coupled to the address register for providing a first signal when a column in said first half plane is designated and a second signal when a column in said second half plane is designated, the improvement comprising means coupled to the storage elements and responsive to either one of said first or one of said second signals for initially causing each of said storage elements to be set to either a first or a second state, respectively, and means coupled to each sense line and responsive to the signals formed thereon in response to a read signal for causing the state of the corresponding information register storage device to be complemented in response to a signal of a first polarity, and thereby cause a representation of the content of the read out column to be stored in the information register.

6. In a system as defined in claim 5 including a signal generator for providing a preset pulse and wherein said means for causing the storage devices to be set comprises gating means responsive to said preset pulse together with the signals from the decoding means for causing each of said storage devices to be set either to the first state or the second state depending whether the signal from the decoding means is a first or a second signal, respectively.

7. In a system as defined in claim 6 wherein said signal generator provides a read strobe signal following the preset pulse and wherein each of said means for causing a storage device to be complemented comprises a gate coupled to the corresponding sense line and responsive to the strobe signal for providing a signal to the corresponding storage device causing the state thereof to be complemented in response to a signal on the corresponding sense line of a predetermined polarity.

8. A method for reading out information from a memory and for storing the information into an information register containing a plurality of storage elements, the memory having a sense line for each storage element which forms a loop passing along one side of thin film memory planes and returns along the opposite side of the memory planes, the portions of the sense lines on each side of the memory planes being transposed at least once causing a pulse of one polarity on the sense lines to represent a first binary bit when reading takes place at a first group of memory locations and causing a pulse of the some polarity on the sense lines to represent a second binary bit when reading takes place at a second group of memory locations the steps comprising presetting each of the storage elements in the information register to either a first state or to a second state when reading is to take place from said first or said second groups of memory locations, respectively, and complementing each storage element whenever the corresponding sense line receives a pulse of said first polarity and thereby cause the storage elements of said information register to store a representation of the information read out from the memory.

References Cited

UNITED STATES PATENTS

| | | | |
|---|---|---|---|
| 3,404,385 | 10/1968 | Ihara | 340—172.5 |
| 3,404,375 | 10/1968 | Snyder | 340—172.5 |
| 3,283,313 | 11/1966 | Hathaway | 340—172.5 |
| 3,054,988 | 9/1962 | Edwards et al. | 340—172.5 |

GARETH D. SHAW, Primary Examiner

U.S. Cl. X.R.

340—174

PO-1050
(5/69)

UNITED STATES PATENT OFFICE
CERTIFICATE OF CORRECTION

Patent No. 3,533,081 Dated October 6, 1970

Inventor(s) J. R. Brown, Jr.

It is certified that error appears in the above-identified patent and that said Letters Patent are hereby corrected as shown below:

Column 2, line 30, "hhe" should be --the--

Column 4, lines 46-47, "The OR gate 108 has inputs connected to the DD output of a signal generator 14." should be deleted.

Column 5, line 23, "gate" should be --gates--

Column 5, line 27, "gates 12, 106, 102" should be --gates 112, 106, and 102--

Column 5, line 31, "address is" should be --address) is --

Column 5, line 54, "determine" should be --determines--

Column 6, line 4, "of", first occurrence, should be --or--

Column 8, line 57, "of" should be --or--

Column 8, line 71, "when" should be --then--

Signed and sealed this 20th day of July 1971.

(SEAL)
Attest:

EDWARD M.FLETCHER,JR.
Attesting Officer

WILLIAM E. SCHUYLER, JR.
Commissioner of Patents